United States Patent
Bhatti

(10) Patent No.: US 7,515,552 B2
(45) Date of Patent: *Apr. 7, 2009

(54) STRUCTURED ADDRESSING METHOD FOR WIRELESS NETWORKS

(75) Inventor: Ghulam Bhatti, Plainville, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 599 days.

This patent is subject to a terminal disclaimer.

(21) Appl. No.: 11/261,890

(22) Filed: Oct. 28, 2005

(65) Prior Publication Data

US 2007/0036090 A1    Feb. 15, 2007

Related U.S. Application Data

(63) Continuation-in-part of application No. 11/199,625, filed on Aug. 9, 2005.

(51) Int. Cl.
*H04L 12/28* (2006.01)

(52) U.S. Cl. .................. 370/254; 370/329

(58) Field of Classification Search .......... 370/389, 370/392, 402, 403, 408, 254, 329
See application file for complete search history.

(56) References Cited

OTHER PUBLICATIONS

S. Nesargi, R. Prakash. "MANETconf: Configuration of Hosts in a Mobile Ad Hoc Network," Proceedings of IEEE Infocom, Jun. 2002.
G. Ricart and A.K. Agrawala, "An optimal algorithm for mutual exclusion in computer networks," Comm. ACM, 24(1), pp. 9-17, 1981.
M. Mohsin and R. Prakash, "IP Address Assignment in a Mobile Ad Hoc Network," IEEE Military Communications Conference (MILCOM 2002), vol. 2, pp. 856-861, Oct. 2002.
Charles E. Perkins, J. T. Malinen, R. Wakikawa, E. M. Belding-Royer, and Y. Sun. "IP Address Autoconfiguration for Ad Hoc Networks," IETF Internet Draft, draft-ietf-manet-autoconf-01.txt, Nov. 2001.

*Primary Examiner*—Chirag G Shah
*Assistant Examiner*—Nima Mahmoudzadeh
(74) *Attorney, Agent, or Firm*—Dirk Brinkman; Gene Vinokur

(57) ABSTRACT

Logical addresses are assigned to nodes in a wireless network from an address space defined as an n-dimensional grid, where intersections have coordinates of the nodes. A component of the coordinates is selected to be associated with a predetermined value. A parent node assigns an unallocated logical address to a child node joining the network such that any component of the child node address is modified, by one, from a corresponding component of the parent node if the selected component of the parent node has the predetermined value. Otherwise, the unallocated logical address is assigned such that the selected component of the child node address is modified by one from the selected component of the parent node.

8 Claims, 5 Drawing Sheets

100

300

500

… (4, 4). The coordi-

STRUCTURED ADDRESSING METHOD FOR WIRELESS NETWORKS

RELATED APPLICATIONS

This application is a Continuation-in-Part of U.S. patent application Ser. No. 11/199,625, entitled "Structured Addressing Scheme for Wireless Networks," and filed by Bhatti et al. on Aug. 9, 2005.

FIELD OF THE INVENTION

This invention relates generally to networks, and more particularly to assigning addresses to nodes in wireless networks.

BACKGROUND OF THE INVENTION

The latest advances in wireless networks have enabled applications such as home and industrial automation; environment monitoring and sensing, security and surveillance; human and goods tracking; and medical monitoring.

In a wireless network, each node can communicate with other nodes that are within transmission range. Each node has a unique identity to facilitate communication among the nodes. Address assignment in an ad hoc network is a problem due to the irregular and spontaneous nature of the network topology.

Some addressing schemes, such as the one used by the ZigBee Alliance, use a hierarchical tree of addresses. For example, a ZigBee coordinator (ZC) node initially has control over all allocated addresses. Subsequently, a parent node, beginning with the ZC node, allocates a portion of its address space to a child node when the child node joins network. Because the number of child nodes for any parent node is fixed as a configuration parameter, it is possible to systematically determine the portions of the address space that is allocated to a joining child node. That facilitates route discovery without explicit route discovery via broadcast messages.

However, the static structure of the ZigBee scheme can waste addresses, or even deny some parent nodes from assigning addresses to potential child nodes. In addition, there is a restriction on the maximum number of levels that the addressing tree can have in the network. Furthermore, a failure of a single node can make nodes with addresses lower in the tree inaccessible. This is a serious problem when the failed node is near the root of the tree.

Another addressing scheme uses a distributed dynamic address assignment protocol, S. Nesargi and R. Prakash, "MANETconf: Configuration of Hosts in a Mobile Ad Hoc Network," Proceedings of IEEE Infocom, June 2002. The protocol is based on a mutual exclusion process based on the Ricart-Agrawala algorithm, G. Ricart and A. K. Agrawala, "An optimal algorithm for mutual exclusion in computer networks," Comm. ACM, 24(1), pp. 9-17, 1981. A joining node selects a neighboring node as an initiator node. The initiator node selects an address and broadcasts a message to notify all other nodes in the network of the selected address. Then, the initiator node waits for responses from the other nodes in the network. If the responses from all of the nodes are positive, meaning no other node is using the selected address, then the initiator node assign this address to the joining node. Otherwise, the initiator node selects another address, and so forth.

However, there are several problems with that protocol. All nodes must maintain information about the allocated addresses. This requires memory, which is a limited resource in small sensor nodes. In addition, the broadcast messages and other management messages consume network resources such as bandwidth and power. Moreover, the initiator node can select any address. Therefore, the address assignment does not necessarily follow a regular or systematic pattern. This makes route discovery a problem.

Another addressing scheme uses a binary split algorithm, M. Mohsin and R. Prakash, "IP Address Assignment in a Mobile Ad Hoc Network," IEEE Military Communications Conference (MILCOM 2002), volume 2, pp. 856-861, October 2002. Each node maintains a block of available addresses. When a node wants to join the network, the joining node requests an address from a neighboring configuring node. The configuring node splits the block into two halves, and retains one half for itself and gives the other half to the requesting node. Every node maintains an address table to record the blocks of addresses. Each node also broadcasts periodically its block of addresses to enable other nodes to update their address tables. Addresses can also be 'borrowed' from other nodes. That scheme also leads to an address assignment that does not follow a regular or systematic pattern.

Another scheme performs duplicate address detection, C. E. Perkins, J. T. Malinen, R. Wakikawa, E. M. Belding-Royer, and Y. Sun, "IP Address Autoconfiguration for Ad Hoc Networks," IETF Internet Draft, draft-ietf-manet-autoconf-01.txt, November 2001. A joining node selects two random addresses for itself, each from a different group of available addresses. One address is used as a temporary source address for a verification process. The other address is intended for a final address assignment, pending the verification process. That scheme also requires a large number of broadcast messages, and addresses are generated randomly.

SUMMARY OF THE INVENTION

Provided is a method for assigning addresses to nodes in a wireless communications network. The method can be used for ad hoc networks, sensor networks, mesh networks, multi-hop networks, and other networks.

The method has a low overhead for memory and broadcast requirements. There are no restrictions on the maximum number of hops, or the number of parent-child node relationships. The method limits the waste of address space when the physical location of the nodes is not uniformly distributed.

DETAILED DESCRIPTION OF THE PREFERRED EMBODIMENTS

Figure 1:
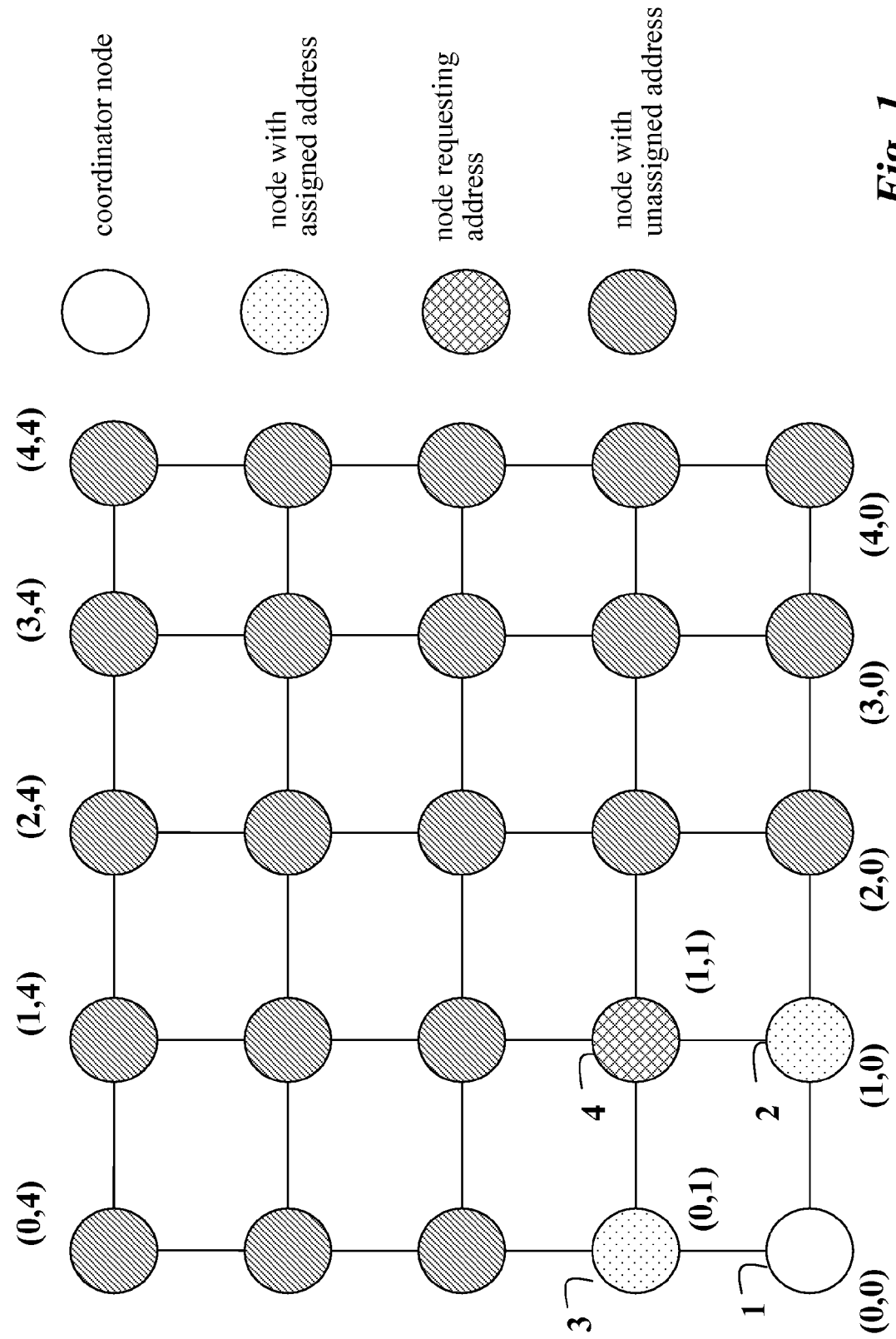
FIG. 1 is a grid of nodes and corresponding addresses in a Cartesian coordinate space according to an embodiment of the invention.

FIG. 1 shows an example n-dimensional grid 100 of nodes, where n is 2, in a wireless network according to an embodiment of our invention. Each intersection of the grid has Cartesian coordinates, e.g., (0, 0), (0, 1), . . . (4, 4). The coordinates of the nodes or n-tuples are logical addresses of corresponding nodes. The coordinates have a number of components that is equal to the dimensionality of the grid. For example, in two dimensions, each logical address has two components.

A range of values for each component is expressed by the number of bits that are assigned to the component. For example, if a full address is specified by 16 bits, then each component can be assigned 8 bits for values in a range [0, 255]. Alternatively, the assignment can be 6 and 10 bits, and so forth. In other words, the grids can be a cube, rectangular or a higher order parallelepiped. Additional dimensions can also be used, e.g., in four dimensions the coordinates of the nodes are (k, l, m, n).

A 'corner' node 1 can be a coordinator node with a logical address (0, 0). Stippled nodes 2-3 have assigned addresses. Cross-hatched node 4 is requesting an address. It should be noted that address assignment can start at any corner node.

If each address component is allocated 8 bits, then the four corner addresses are (0x0, 0x0), (0x0, 0xFF), (0xFF, 0x0), and (0xFF, 0xFF). We have selected (0x0, 0x0) as the starting address as a matter of convenience.

An unallocated logical address is assigned to a child node joining the network by having the child node first broadcast an address request message. In a ZigBee network, this can be a 'beacon request' message. All potential parent nodes within transmission range reply by sending a beacon frame to the requesting node. That frame contains an identification of the sender in addition to some extra information. The child node selects one of the replying potential parent nodes as the parent node. The selection can consider the compactness of the logical address space or the signal strength of the responding node.

The selected parent node then assigns a child node address to the joining child node as follows. The value of one component of the child node address is made one larger than the corresponding component of the parent node. For example, if the address of the parent node $N_1$ is (0, 0), then the address of the joining child node $N_2$ can be (0x1, 0x0) or (0x0, 0x1).

Other nodes that can possibly assign the same address at a later time are notified of the address assignment. For example, in FIG. 1, both nodes 2 and 3 can assign the same address to node 4. If node 2 assigns first, then node 3 is informed by node 2 that the address (1, 1) has been allocated to node 4.

In one embodiment of the invention, the assignment order can be according to a predetermined indexing scheme of the coordinate components. For example, the first component is incremented before the second component. Thus, the ordering can cause the addresses to be uniformly distributed.

Figure 2:
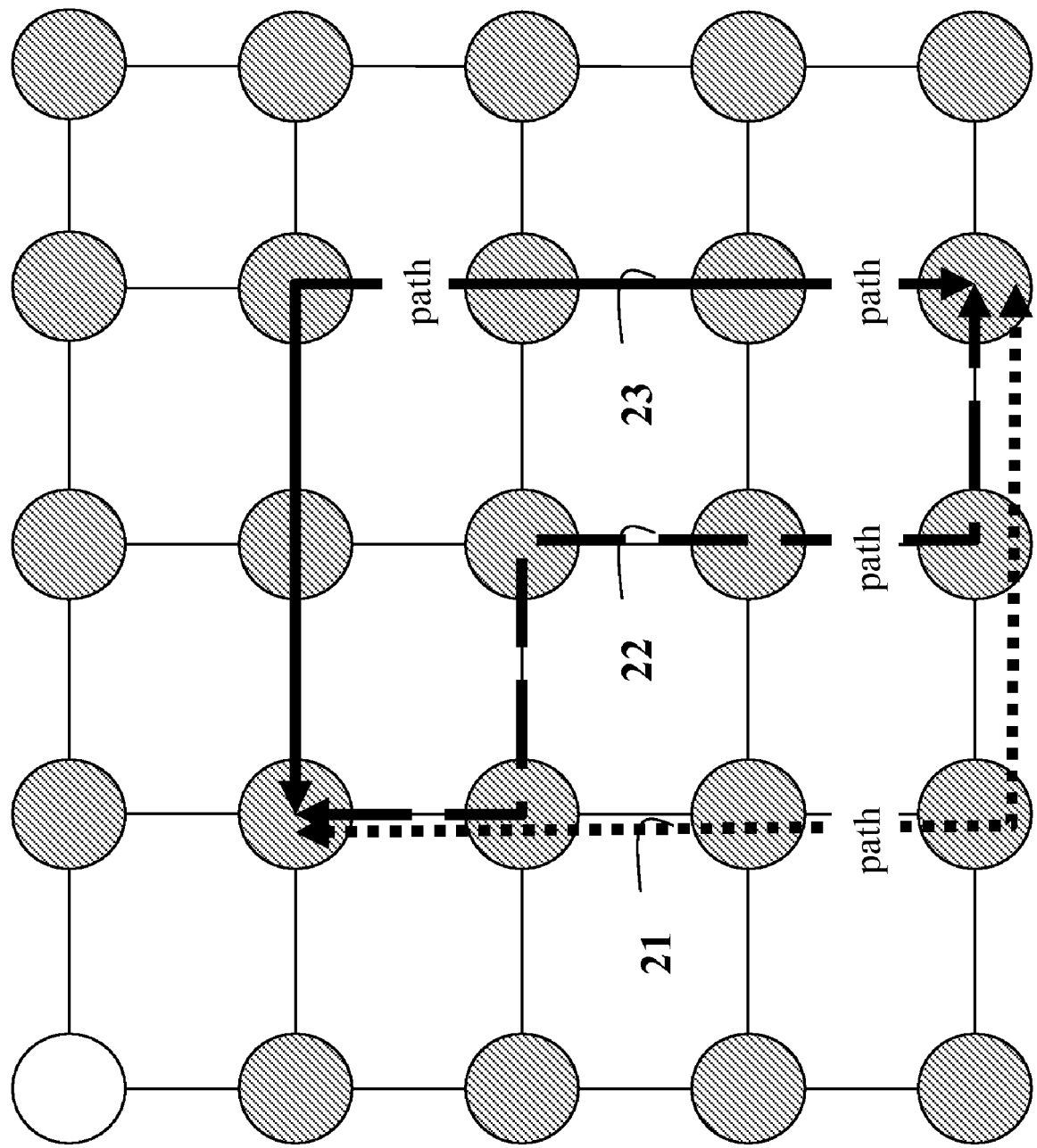
FIG. 2 is grid showing multiple routes.

It should be noted, that the selected addressing order also implies possible routing between any two nodes. In addition, unlike the tree-structured routing of ZigBee, which only has one path to a particular node, our addressing scheme allows multiple paths 21-23, as shown in FIG. 2. Thus, the network, as a whole, is not affected by a failure of a single node. In fact, the network can continue to function even with multiple failed nodes, particularly if the number of dimensions of the grid is relatively high.

Address Clashes

Address clashes, where other nodes can assign to the joining child node address, can be avoided as described above, i.e., when an address is assigned to a joining child node by the selected parent node, other nodes that can possibly assign the same address at a later time are notified of the address assignment. However, the need to notify other nodes causes additional overhead to the system.

In one embodiment, addresses are assigned to child nodes according to a selected component of the coordinates associated with a predetermined value. A parent node can assign an unallocated logical address as a child node address such that any component of the child node address is modified, by one, from a corresponding component of the parent node if the selected component of the parent node has the predetermined value. Otherwise, the parent node assigns the child node an unallocated logical address as a child node address such that the selected component of the child node address is modified, by one, from the selected component of the parent node.

Figure 3:
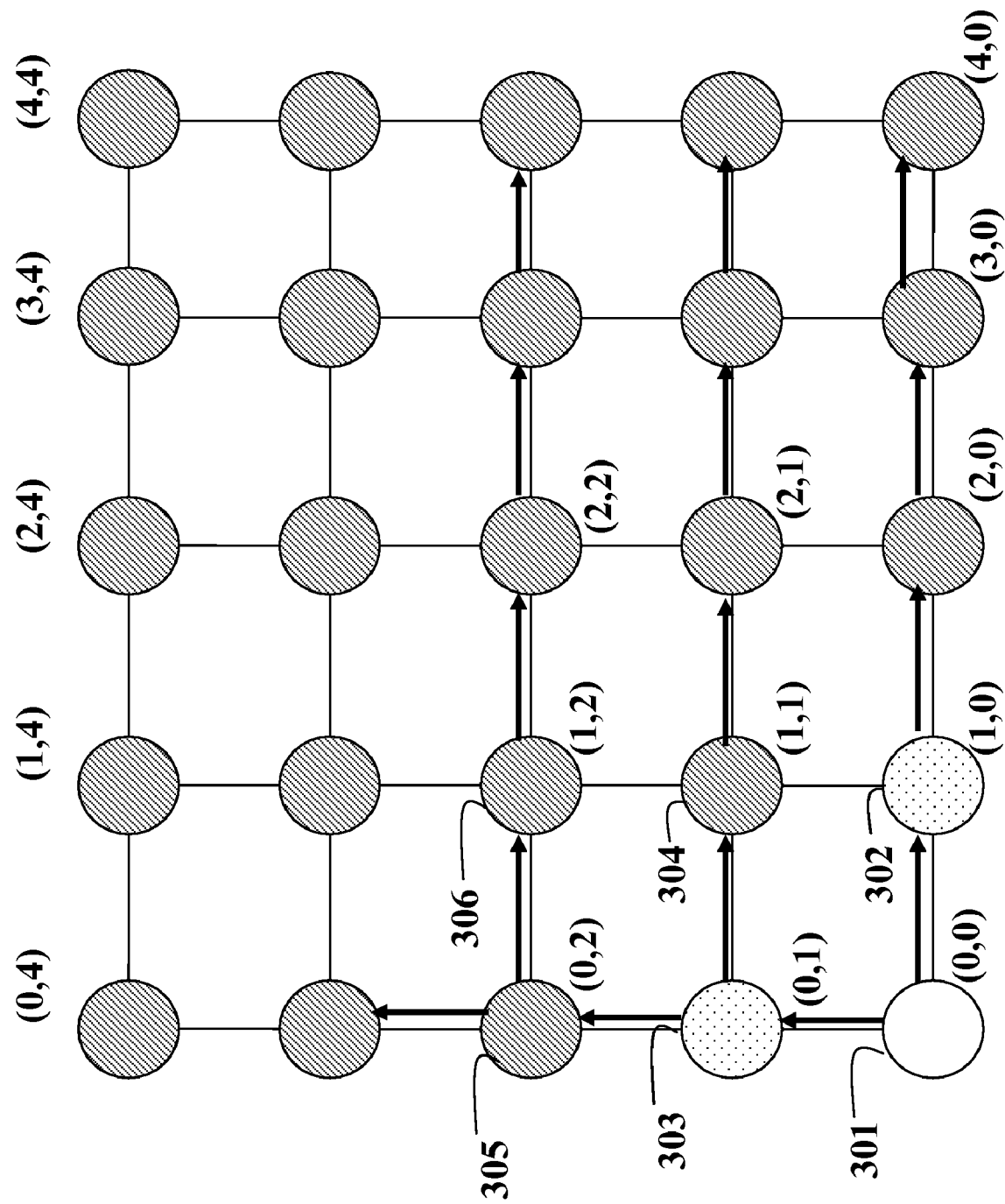
FIG. 3 is a grid of nodes and corresponding addresses in a Cartesian coordinate space according to an embodiment of the invention.

FIG. 3 shows n-dimensional grid 300 of nodes, where n is 2, in a wireless network according to an embodiment of our invention. It should be understood that the invention is not limited to two dimensions. Here, the first component is the selected component and the predetermined value is zero (0). Therefore, coordinator node 301 at [0,0], acting as a parent node, can assign [1,0] 302 or [0,1] 303 as a child node address, because the selected component of the coordinator node, i.e., the first component, has the predetermined value (0). The same is true for a parent node at address [0,1] 303. Since the selected component has the predetermined value, the parent node at [0,1] can assign to [1,1] 304, or [0,2] 305, or [0,0], 301, if [0,0] is available, i.e., if the coordinator node has different coordinates and [0,0] is an unallocated logical address.

On the other hand, a parent node at [1,0] 302, or [1,1] 304, or [1,2] 306, can only assign an unallocated logical address as a child node address such that the selected component of the child node address is modified, by one, from the selected component of the parent node. So a parent node at (1,0) 302, can only assign an address that modifies the selected component, i.e., the first component, by one, which would be (2,0) or (0,0), if available.

It should be noted that this addressing method can be represented as a tree.

Figure 4:
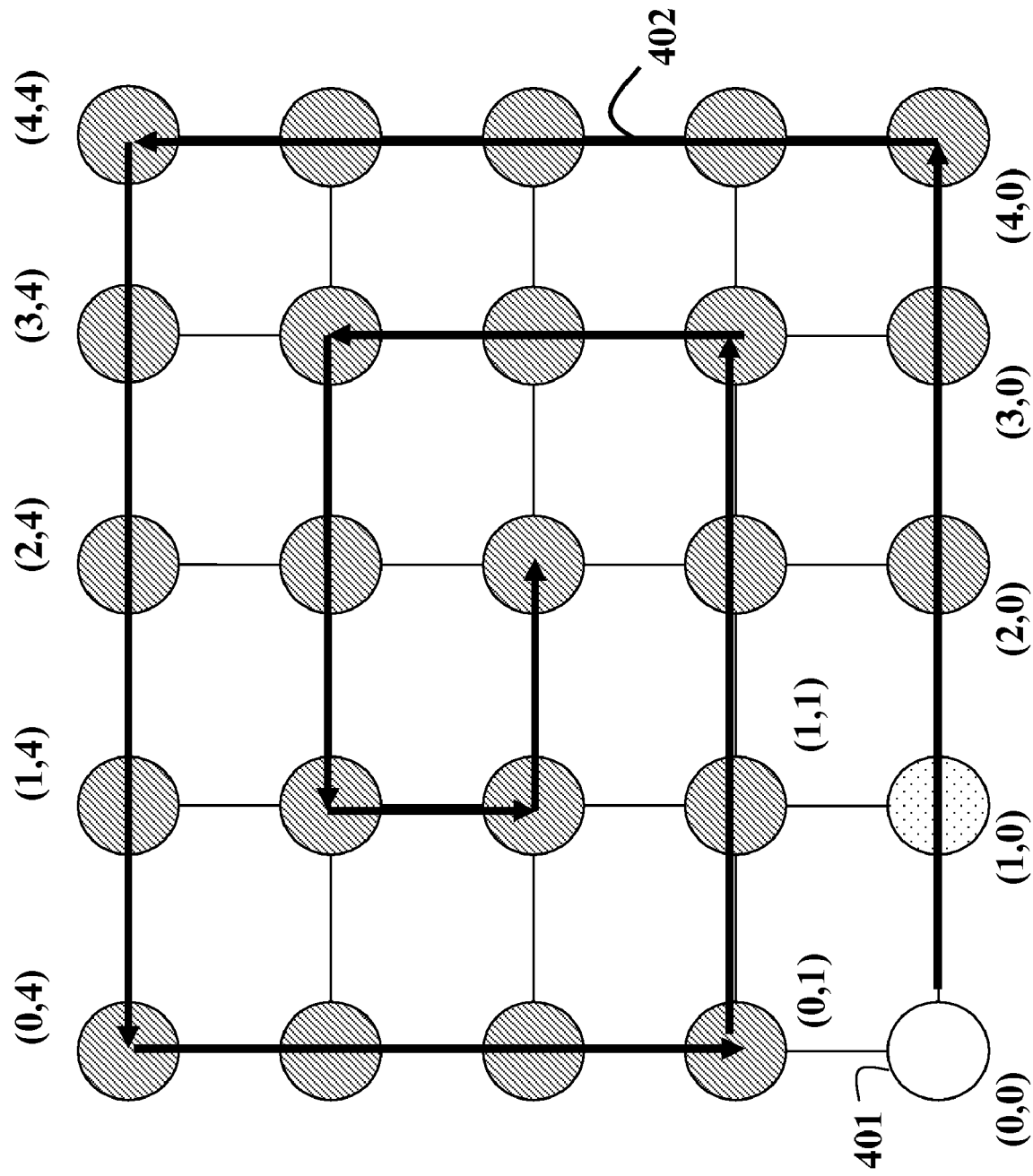
FIG. 4 is a grid of nodes and a corresponding sequence of addresses in a Cartesian coordinate space according to another embodiment of the invention.
Figure 5:
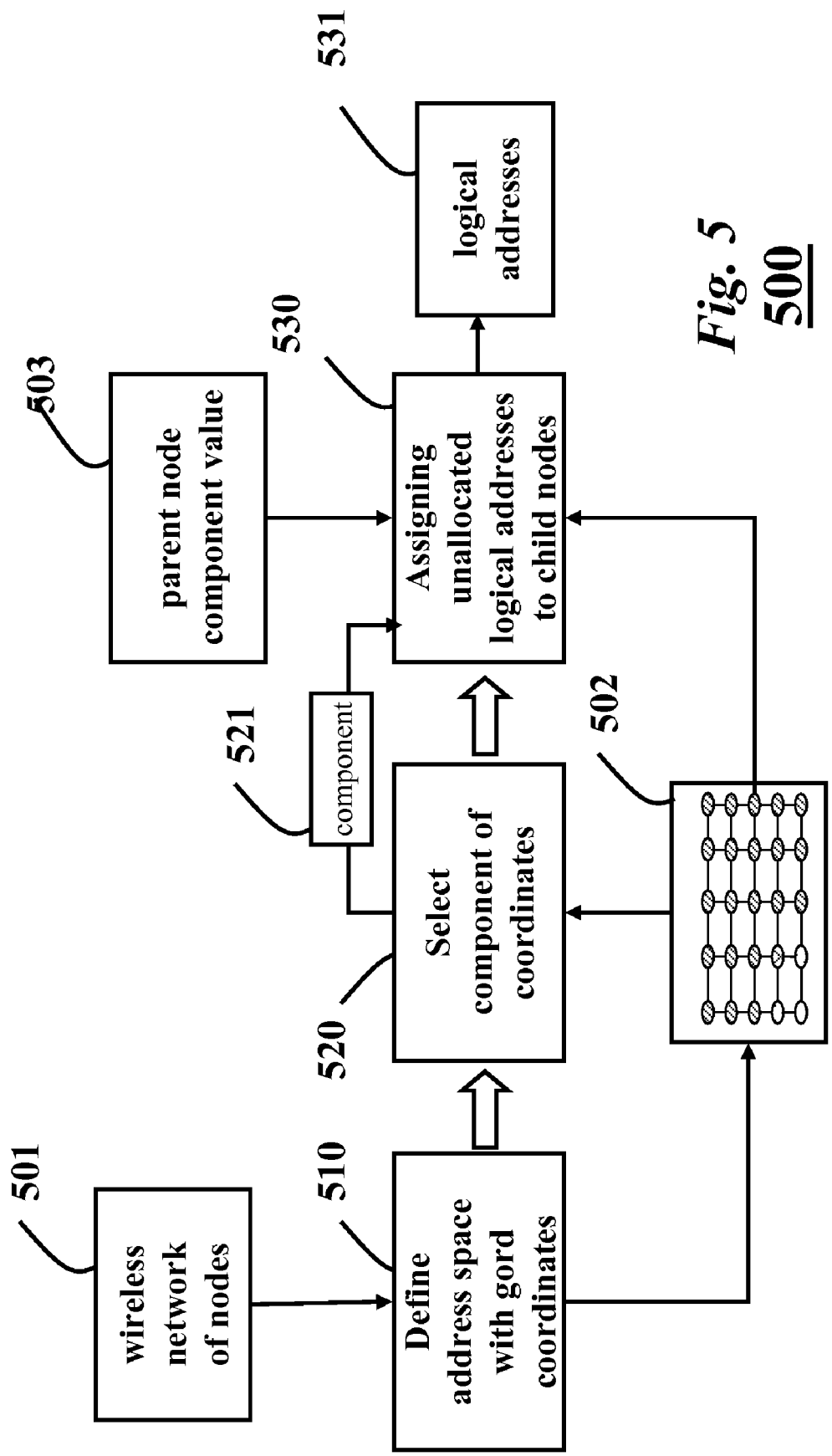
FIG. 5 is a flow diagram of a method for assigning addresses to nodes in a wireless network according to an embodiment of the invention.

It is possible to define many different addressing schemes by including additional conditions on the embodiment described above. For example, a set of components can be selected and associated with a single predetermined value, or each select component of the set can be associated with a different predetermined value. In short, a set of selected components can be associated with a set of predetermined values, where either or both sets can be one. For example, as shown in FIG. 4, it is possible use the method for assigning addresses according to the invention using sets of components and predetermined values to assign addresses beginning at a coordinator node 401 in a spiral pattern 402, without address clashes or a need to notify other nodes of address assignments.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention. Logical addresses 531 are assigned to nodes in a wireless network 501 from an address space defined 510 as an n-dimensional grid 502, where intersections have coordinates of the nodes. A component 521 of the coordinates is selected to be associated with a predetermined value. A parent node assigns 530 an unallocated logical address to a child node joining the network such that any component of the child node address is modified, by one, from a corresponding component of the parent node if the selected component of the parent node has the predetermined value 503. Otherwise, the unallocated logical address is assigned such that the selected component of the child node address is modified by one from the selected component of the parent node.

I claim:

1. A method for assigning addresses to nodes in a wireless network, comprising:

defining an address space as an n-dimensional grid, each grid intersection having coordinates of a corresponding possible node of a wireless network, a number of components of each coordinate being equal to a dimensionality of the grid, and the coordinates forming a logical address of the corresponding possible node;

selecting a component of the coordinates to be associated with a predetermined value;

assigning, by a parent node to a child node joining the wireless network, an unallocated logical address as a child node address such that any component of the child node address is modified, by one, from a corresponding component of the parent node if the selected component of the parent node has the predetermined value; and otherwise assigning, by the parent node to the child node joining the wireless network, an unallocated logical address as a child node address such that the selected component of the child node address is modified, by one, from the selected component of the parent node.

2. The method of claim 1, wherein a set of components is selected to be associated with a set of predetermined values.

3. The method of claim 1, wherein a range of possible values of each component is determined by a number of bits used to express the component.

4. The method of claim 1, in which the grid is in a form of a parallelepiped.

5. The method of claim 1, further comprising:

assigning coordinates of a corner of the grid as the logical address of a coordinator node of the network.

6. The method of claim 1, further comprising:

broadcasting, by the child node, an address request message;

replying to the broadcast request message by one or more potential parent nodes; and selecting, in the child node, one of the potential parent nodes as the parent node.

7. The method of claim 1, in which the selecting is based on a signal strength of the replying nodes.

8. The method of claim 1, in which the logical address implies a route between the nodes.

* * * * *